April 29, 1941.   H. E. TAUTZ   2,240,426
SWITCH BOX
Filed Feb. 3, 1939
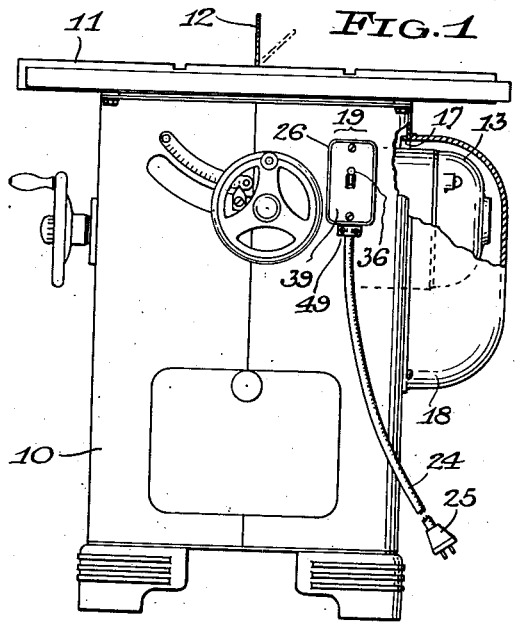
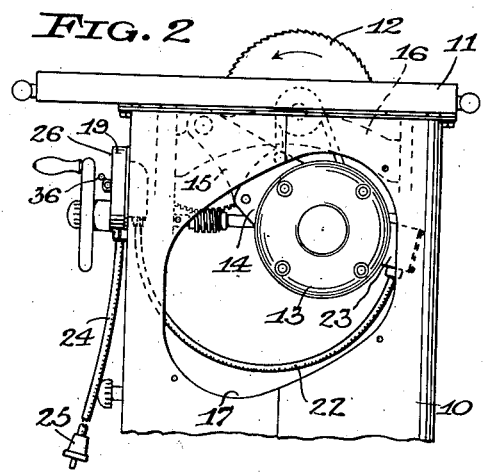
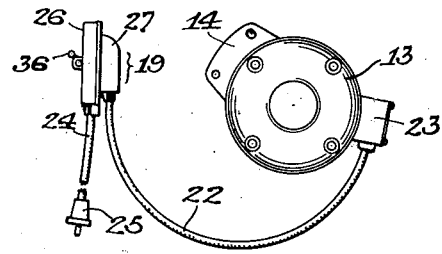
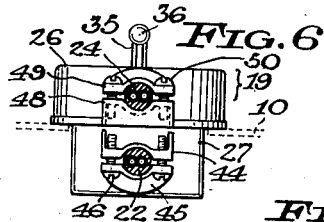
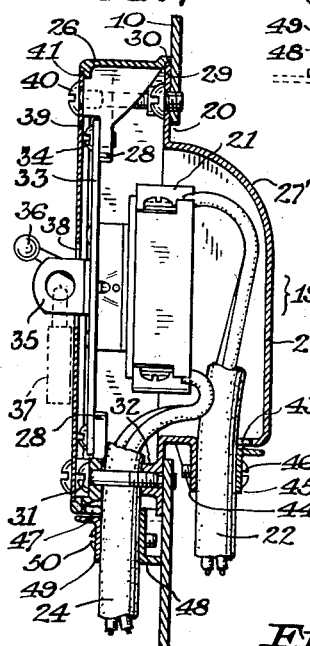
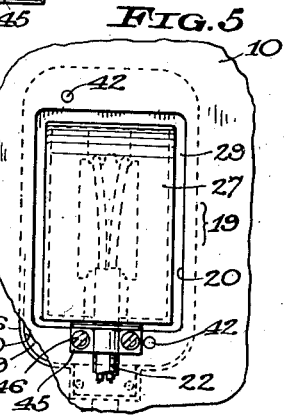
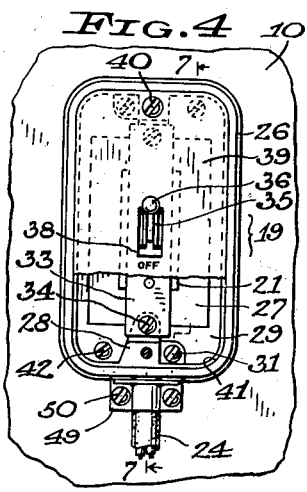
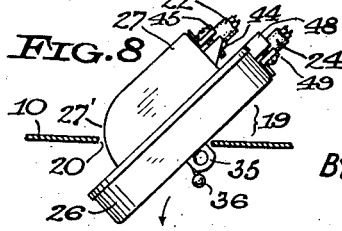
INVENTOR
HERBERT E. TAUTZ
BY
ATTORNEY
WITNESSES Patented Apr. 29, 1941

2,240,426

UNITED STATES PATENT OFFICE 2,240,426

SWITCH BOX

Herbert E. Tautz, Milwaukee, Wis., assignor to The Delta Manufacturing Company, Milwaukee, Wis., a corporation of Wisconsin Application February 3, 1939, Serial No. 254,375

2 Claims. (Cl. 174—48)

The present invention relates to switch boxes and to wiring assemblies including the same.

In various motor-driven machines it is found desirable to provide detachably mounted motors and to supply the motors separately from the machines, so as to facilitate shipment and assembly and to permit a choice of motors. It is frequently necessary to place a controlling switch for the motor at a distance from the motor, as on the wall of the cabinet or frame for the machine, and to movably mount the motor to accommodate adjustment of the machine.

It is an object of the present invention to provide an improved switch box adapted for mounting on a machine and permitting a motor to be flexibly wired thereto to form a unit which can be supplied separately from the machine and which will avoid the necessity for making wiring connections when the motor and switch box are installed on the machine.

Another object is to provide a switch box which is of strong, durable and inexpensive construction, and which will facilitate the attachment thereto of flexible conductor cords.

The invention further consists in the several features hereinafter described and claimed.

In the accompanying drawing, illustrating one specific embodiment of the invention—

Fig. 1 is a front elevation of a machine provided with a motor-controlling switch box of the invention, parts of the machine being broken away and parts being shown in section;

Fig. 2 is a side elevation of the machine with its mounted switch box, parts of the machine being removed;

Fig. 3 is a side view of the switch box and motor assembly ready to be applied to the machine;

Fig. 4 is a front view of the mounted switch box, parts being broken away;

Fig. 5 is a rear view of the mounted switch box;

Fig. 6 is a bottom view of the switch box;

Fig. 7 is a sectional elevation of the mounted switch box, taken generally on the line 7—7 of Fig. 4, and Fig. 8 is a detail view showing the manner of passing the switch box through an apertured mounting wall of the circular saw cabinet or casing.

In the drawing, the invention is illustrated by way of example in connection with a circular saw of the tilting arbor type comprising an upright frame or tubular casing 10 having mounted thereon an apertured table 11 through which a tiltably mounted rotatable saw blade 12 is adjustably extensible, the machine here shown being more particularly disclosed in my copending application for Machine cabinets, Serial No. 245,199, filed December 12, 1938, and in my copending application for Tilting arbor saws, Serial No. 252,744, filed January 25, 1939. The saw blade is belt-driven by an electric motor 13 the frame of which is provided with one or more apertured mounting flanges 14 for adjustably and detachably securing the motor to an arm or bracket 15 swingably mounted on a tiltable carriage or cradle 16 of the machine. A side wall of the casing 10 has an opening 17 to permit mounting of and access to the motor and to provide clearance for the motor, this opening being preferably closed by a detachable cover 18, Fig. 1.

The motor is controlled by a switch box designated generally by 19 and mounted as hereinafter described on a wall of the casing 10, preferably the front wall, this wall having a rectangular opening 20 through which the switch box extends. The switch box includes a switch 21 which is preferably of the double-pole toggle type. A flexible conductor cord 22 has one end portion secured to the inner portion of the switch box and electrically connected to one set of the switch terminals, and has its other end portion secured to a terminal box 23 on the motor and electrically connected to the motor. A flexible lead-in conductor cord 24 has one end portion secured to the outer portion of the switch box and electrically connected to the other set of switch terminals, and has its free end portion secured and connected to a terminal plug 25 adapted for detachable connection with an electrical receptacle, not shown. The motor 13, cord 22, switch box 19, and plug-carrying cord 24 form a unitary assembly, as seen in Fig. 3, adapted to be supplied separately from the motor and to be installed on the machine, as hereinafter described, without the necessity for making any wiring connections.

The switch box 19 comprises an outer loop-shaped frame 26 and a rear housing 27, the latter having a curved upper wall 27'. The frame 26 is of generally rectangular form and has inturned apertured lugs or projections 28 at its upper and lower ends. The rear housing 27 has a flat marginal flange 29, the outer edge of which fits in a marginal rabbet 30 formed in the rear edge of the frame 26. The frame 26 is rigidly secured to the rear housing by screws 31 which pass through the lugs 28 and are threaded into bosses 32, Fig. 7, formed on the front face of the housing flange 29. The toggle switch 21 includes a front mounting plate 33 having its opposite ends secured to the lugs 28 by screws 34, the switch projecting into the rear housing 27. The switch also includes a pair of spaced forwardly projecting apertured ears 35 forming between them a passage for the toggle lever 36 of the switch, the ears being adapted to receive therethrough the shackle of a padlock 37, Fig. 7, to prevent unauthorized operation of the switch. The ears and toggle lever pass through an opening 38 in a sheet metal front plate 39 which is secured by screws 40 to the lugs 28 of the switch box frame 26, the edge of the front plate fitting in a marginal rabbet 41 formed in the front edge of the frame. The flange 29 of the rear housing 27 is somewhat larger and wider than the opening 20 in the front casing wall of the machine and is secured in abutment with the outer face of this wall around the opening by screws 42 which are tapped into the wall, these screws being applied before the front plate 39 is finally attached to the switch box frame.

The flexible conductor cord 22 passes upwardly through an opening 43 in the bottom wall of the switch housing 27 and bears laterally against a saddle projection 44 formed on this bottom wall, to which the cord is firmly clamped by a flanged yoke 45 secured by screws 46 to the projection, the yoke also covering the opening 43. The flexible lead-in conductor cord 24 passes upwardly through an opening 47 in the bottom wall of the switch box frame 26 and bears laterally against a saddle projection 48 on this bottom wall, to which the cord is firmly clamped by a flanged yoke 49 secured by screws 50 to the projection, the yoke also covering the opening 47. The two cords are thus approximately parallel where they enter the bottom portion of the switch box.

The switch box frame 26, housing 27, and cord-clamping yokes 45 and 49 may be formed of die castings, thus minimizing machining operations.

The switch box is preferably wired to the motor at the factory, thus insuring good workmanship. For this operation, the switch 21 may be left unattached to the switch box to permit access to the switch terminals, the cords 22 and 24 being drawn through the respective switch box openings 43 and 47 a sufficient distance to permit convenient connection of the cords to the switch. The switch is then attached to the switch box and the cord-clamping yokes 45 and 49 are fastened in place.

The opening 17 in the side wall of the casing 10 is sufficiently large to permit convenient installation of the motor, but the switch box opening 20 in the front wall of the casing is considerably smaller than the motor.

When the assembly comprising the motor and connected switch box is to be installed on the machine, the motor is introduced through the casing opening 17 and is mounted on its supporting arm or bracket 15. The switch box 19 with both cords attached, but with the front plate 39 temporarily removed, is then turned sideways and inserted from the rear through the opening 20 in the front wall of the machine casing 10, a passing position of the switch box being indicated in Fig. 8, wherein the rounded portion 27' of the switch box is adjacent to a side edge of the opening. After the switch box is passed entirely through the opening 20, the lead-in cord 24 is pulled forwardly through the opening, and the switch box is then fastened to the front casing wall by the screws 42. The front plate 39 of the switch box is then fastened in place, and the machine is ready for use.

After the switch box is mounted in place, the casing opening 20 through which it extends is entirely concealed by the front portion of the switch box. The flexible lead-in cord 24 is outside of the casing, and the flexible cord 22 connecting the switch box and motor is inside of the casing and is in the form of a suspended loop, permitting rise and fall of the motor as well as tilting of the motor, incident to adjustment of the rotatable saw blade 12. When the switch is in the "off" position, the line voltage is entirely cut off from the motor.

By means of the invention, the switch and motor are completely wired together, ready to attach to the machine, and it is not necessary for the user or other installer to do wiring or splicing of any kind.

While the invention is here shown to be applied to a circular saw it is also applicable to various other types of machines and appliances.

What I claim as new and desire to secure by Letters Patent is:

1. In combination, with an appliance having a casing with a switch box receiving opening, a wiring assembly for said appliance comprising a translating device and a controlling switch box therefor and having a lead-in conductor cord connected to said switch box and a second conductor cord connecting said switch box and translating device, said switch box being wider and taller than the opening but of width and depth small enough to pass through the opening, said switch box and its attached lead-in cord extending out beyond said opening whereas the second conductor cord remains inside the casing, and means for securing said switch box to the said casing in such position.

2. In combination, with an appliance having a casing with an opening, a wiring assembly for said appliance comprising a translating device and a controlling switch box therefor and having a lead-in conductor cord connected to said switch box and a second conductor cord connecting said switch box and said translating device, said switch box and its attached lead-in cord being small enough in one pair of dimensions to pass through said opening from the inside of the casing and large enough in another pair of dimension to overlap and form a closure for said opening, said switch box having a portion projecting outwardly from said casing and to which said lead-in cord is attached, and said switch box having a portion projecting inwardly from said casing and to which said second cord is attached.

HERBERT E. TAUTZ.